US011125572B2

(12) United States Patent
Inada et al.

(10) Patent No.: US 11,125,572 B2
(45) Date of Patent: Sep. 21, 2021

(54) ELECTRONIC CONTROL DEVICE FOR AUTONOMOUS DRIVING OF A VEHICLE

(71) Applicant: HITACHI AUTOMOTIVE SYSTEMS, LTD., Ibaraki (JP)

(72) Inventors: Ryoichi Inada, Tokyo (JP); Tatsuya Horiguchi, Tokyo (JP); Teppei Hirotsu, Tokyo (JP); Hideyuki Sakamoto, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 124 days.

(21) Appl. No.: 16/462,468

(22) PCT Filed: Oct. 26, 2017

(86) PCT No.: PCT/JP2017/038634
§ 371 (c)(1),
(2) Date: May 20, 2019

(87) PCT Pub. No.: WO2018/092539
PCT Pub. Date: May 24, 2018

(65) Prior Publication Data
US 2019/0376799 A1  Dec. 12, 2019

(30) Foreign Application Priority Data
Nov. 21, 2016 (JP) .............................. JP2016-225996

(51) Int. Cl.
*G01C 21/34* (2006.01)
*G05D 1/00* (2006.01)

(52) U.S. Cl.
CPC ....... *G01C 21/3415* (2013.01); *G05D 1/0088* (2013.01); *G05D 2201/0213* (2013.01)

(58) Field of Classification Search
CPC .. G06F 15/7867; G06F 9/3879; G06F 9/3897; Y02D 10/00; Y02D 10/12;
(Continued)

(56) References Cited

U.S. PATENT DOCUMENTS

| 2003/0060958 A1* | 3/2003 | Henneken | ............... F16H 59/58 |
| | | | 701/51 |
| 2005/0272197 A1* | 12/2005 | Tanaka | ................... G06F 9/3879 |
| | | | 438/222 |

(Continued)

FOREIGN PATENT DOCUMENTS

| JP | 2005-353396 A | 2/2005 |
| JP | 2008-146168 A | 6/2008 |

OTHER PUBLICATIONS

Extended European Search Report dated Nov. 17, 2020 for European Patent Application No. 17870904.4.
(Continued)

*Primary Examiner* — Alexander G Kalinowski
*Assistant Examiner* — Sanjeev Malhotra
(74) *Attorney, Agent, or Firm* — Volpe Koenig

(57) ABSTRACT

There is achieved an electronic control device capable of calculating an optimal travel plan even during dynamic reconfiguration of a calculation circuit configuration. When a driving state changes, a travel plan parameter generation/selection unit divides evaluation calculation units into two blocks and performs reconfiguration of the respective evaluation calculation units a plurality of times via a reconfiguration control unit. While the evaluation calculation units are reconfigured, the evaluation calculation units performs evaluation calculation, and while the evaluation calculation units are reconfigured, the evaluation calculation units perform evaluation calculation. Thus, even while some of the evaluation calculation units are being reconfigured, it is (Continued)

possible to continue evaluation of the travel plan in the rest of the evaluation calculation units.

9 Claims, 7 Drawing Sheets

(58) Field of Classification Search
CPC .. Y02D 10/13; B60W 10/06; H03K 19/17748; Y02T 10/72
USPC ...... 701/2, 22, 41, 51, 54, 70, 96, 117, 409; 710/8, 305; 711/104; 712/42, 43, 221; 713/100; 716/102; 718/102, 105; 438/222
See application file for complete search history.

(56) References Cited

U.S. PATENT DOCUMENTS

| | | | | |
|---|---|---|---|---|
| 2008/0098211 | A1* | 4/2008 | Maeda | G06F 15/7867 713/100 |
| 2009/0281695 | A1* | 11/2009 | Wilson | G07C 5/004 701/54 |
| 2009/0327655 | A1* | 12/2009 | Yoshikawa | G06F 15/7867 712/42 |
| 2010/0010706 | A1 | 1/2010 | Gormley | |
| 2010/0042751 | A1* | 2/2010 | Ishino | G11C 7/10 710/8 |
| 2010/0070671 | A1* | 3/2010 | Vorbach | G06F 15/7867 710/305 |
| 2010/0082943 | A1* | 4/2010 | Yamamoto | G06F 15/7867 712/43 |
| 2011/0153981 | A1 | 7/2011 | Yancey et al. | |
| 2011/0225415 | A1* | 9/2011 | Yamada | G06F 15/7878 713/100 |
| 2012/0204181 | A1* | 8/2012 | Yachide | G06F 9/5066 718/102 |
| 2013/0013164 | A1* | 1/2013 | Taguchi | B60W 50/0097 701/96 |
| 2013/0024826 | A1* | 1/2013 | Master | G06F 30/33 716/102 |
| 2013/0173117 | A1* | 7/2013 | Bertsch | B62D 11/04 701/41 |
| 2013/0238178 | A1* | 9/2013 | Young | F16H 61/468 701/22 |
| 2014/0277890 | A1* | 9/2014 | Ideshio | F02N 11/0851 701/22 |
| 2014/0358389 | A1* | 12/2014 | Lundberg | F16H 9/18 701/54 |
| 2015/0135191 | A1* | 5/2015 | Kelem | H03K 19/173 718/105 |
| 2015/0197226 | A1* | 7/2015 | Svensson | B60T 8/26 701/70 |
| 2015/0239365 | A1* | 8/2015 | Hyde | B60L 1/06 701/2 |
| 2016/0005310 | A1* | 1/2016 | Takao | G08G 1/00 701/117 |
| 2016/0042639 | A1* | 2/2016 | Onishi | G06Q 50/30 701/117 |
| 2016/0092213 | A1* | 3/2016 | Furukawa | G06F 9/3897 712/221 |
| 2016/0154602 | A1* | 6/2016 | Obayashi | H03K 19/17756 711/104 |
| 2016/0161259 | A1* | 6/2016 | Harrison | G01C 21/165 701/409 |
| 2016/0210156 | A1* | 7/2016 | Sato | G06F 9/4401 |
| 2018/0060096 | A1* | 3/2018 | Kukimiya | G06F 15/7871 |
| 2018/0225403 | A1* | 8/2018 | Nicol | H03K 19/0008 |
| 2019/0102173 | A1* | 4/2019 | Vorbach | G06F 3/0683 |

OTHER PUBLICATIONS

Shreejith et al., "Reconfigurable Computing in Next-Generation Automotive Networks", IEEE Embedded Systems Letters, vol. 5, No. 1, Mar. 2013.

International Search Report dated Jan. 9, 2018 for the PCT International Application No. PCT/JP2017/038634.

* cited by examiner

FIG. 2

| TIME | TRAVEL PLAN PARAMETER ||
|---|---|---|
| | HOST VEHICLE STEERING AMOUNT [deg] | HOST VEHICLE ACCELERATION/DECELERATION [G] |
| AFTER 0 SECONDS | ±0 | ±0 |
| AFTER $\Delta t$ SECONDS | ±0 | ±0 |
| AFTER $2\Delta t$ SECONDS | ±0 | +0.01 |
| AFTER $3\Delta t$ SECONDS | +1 | +0.01 |
| ⋮ | ⋮ | ⋮ |
| AFTER $n\Delta t$ SECONDS | −1 | ±0 |

ELECTRONIC CONTROL DEVICE FOR AUTONOMOUS DRIVING OF A VEHICLE

TECHNICAL FIELD

The present invention relates to an electronic control device.

BACKGROUND ART

An electronic control device for autonomously driving a vehicle performs a process of calculating a travel plan for traveling in an optimal path and at an optimal speed to a destination in addition to a process of perceiving a road sign or an obstacle. In order to calculate an optimal travel plan in consideration of ride comfort or travel time while avoiding obstacles, a large amount of calculation is required, and a calculation unit with a large calculation capacity is required to achieve the large amount of calculation.

As a technique for improving the calculation capacity of the calculation unit, a method using dynamic reconfiguration is known. The dynamic reconfiguration is a technique for changing a calculation circuit configuration in a reconfigurable circuit being operated. Using this dynamic reconfiguration, the calculation circuit is changed depending on the situation, and even a small-scale reconfigurable circuit can have a large calculation capacity.

PTL 1 is disclosed as a background art in this technical field. As described in PTL 1, "a control unit 13 controls a dynamic reconfiguration control unit 16 on the basis of information from a sensor 18 in a vehicle to reconfigure a circuit of image processing hardware 11, thereby always enabling image processing depending on a driving environment. The control unit 13 controls an external device 19, such as a headlight or a brake, on the basis of information to which image processing is performed as described above".

CITATION LIST

Patent Literature

PTL 1: JP 2005-35396 A

SUMMARY OF INVENTION

Technical Problem

In the technique described in PTL 1, the dynamic reconfiguration is performed to change the configuration of an image processing circuit in a reconfigurable circuit and processing parameters depending on a driving state.

However, the circuit is configured not to perform calculation during the dynamic reconfiguration, and alternative processing, such as stopping an output therefrom or directly outputting a previous calculated value, is required. When such alternative processing is performed in travel plan calculation, if a new obstacle is discovered during dynamic reconfiguration, the change of the vehicle trajectory will be delayed, the possibility of collision with the obstacle will increase, and suddenly turning a steering wheel or sudden deceleration may have to be carried out.

An object of the present invention is to achieve an electronic control device capable of calculating an optimal travel plan even during dynamic reconfiguration of a calculation circuit configuration.

Solution to Problem

In order to achieve the above object, the present invention is configured as follows.

An electronic control device includes a controller which outputs a travel plan parameter and a reconfiguration instruction, a memory which stores data, and a reconfigurable circuit which includes a plurality of evaluation calculation units for performing travel evaluation calculation by using the travel plan parameter output from the controller, in which when the reconfiguration instruction is output from the controller, the reconfigurable circuit divides the plurality of evaluation calculation units into a plurality of blocks, for divisional performance of reconfiguration processing by the number of divisions.

Advantageous Effects of Invention

According to the present invention, an electronic control device capable of calculating an optimal travel plan even during dynamic reconfiguration of a calculation circuit configuration can be achieved.

Problems, configurations, and effects other than those in the above description will be made clear in the following description of the embodiments.

BRIEF DESCRIPTION OF DRAWINGS

FIG. 2 is a table illustrating an example of steering angles and accelerations/decelerations of a host vehicle as travel plan parameters.

DESCRIPTION OF EMBODIMENTS

Hereinafter, embodiments of the present invention will be described with reference to the accompanying drawings.

EMBODIMENTS

First Embodiment

In a first embodiment of the present invention, an example of an electronic control device will be described which is configured to continue travel plan calculation even during dynamic reconfiguration in a vehicle.

Figure 1:
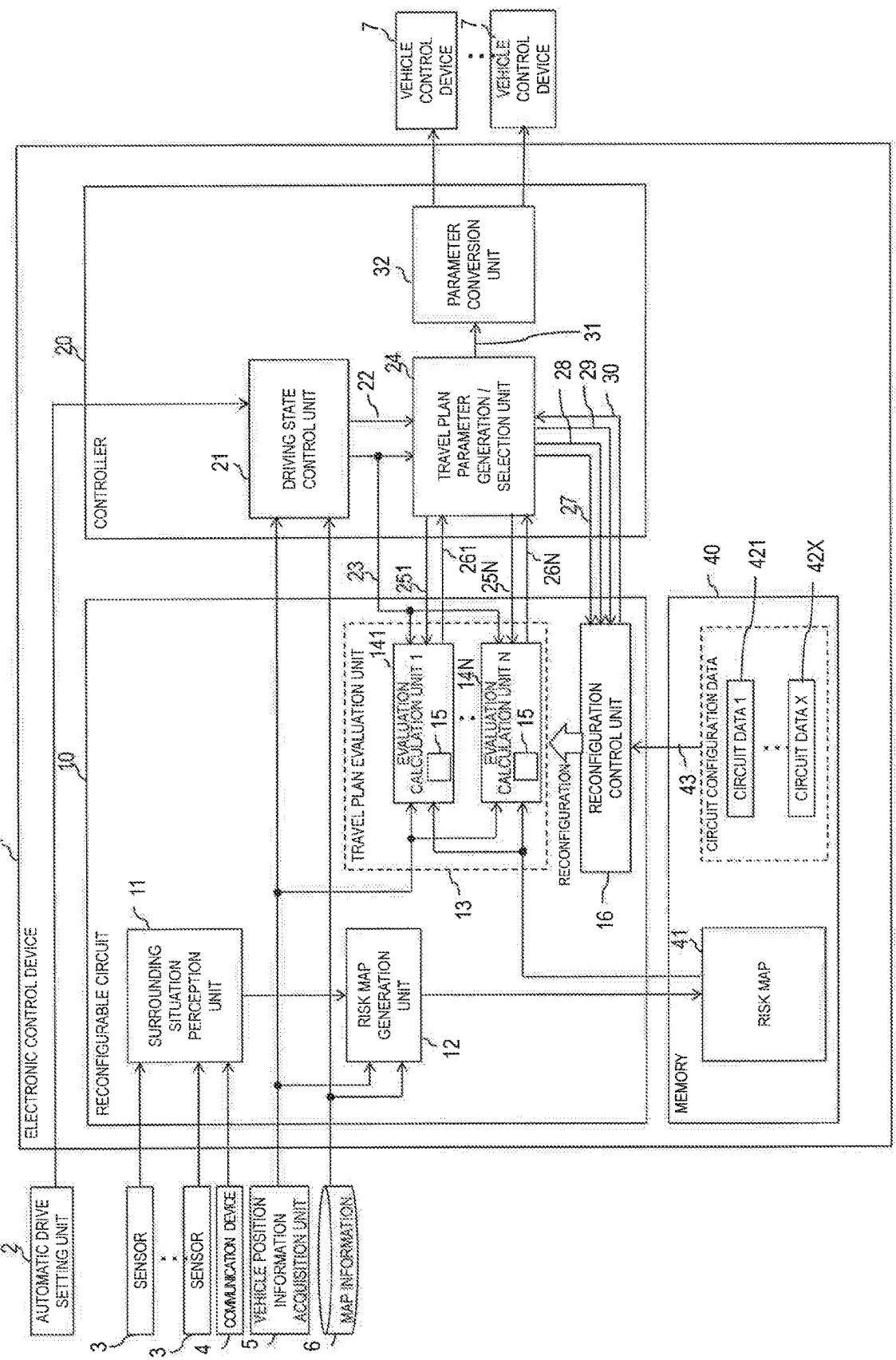
FIG. 1 is a diagram illustrating a configuration example of an electronic control device and peripheral circuits according to a first embodiment of the present invention.

FIG. 1 is a diagram illustrating a configuration example of the electronic control device and peripheral circuits according to the first embodiment of the present invention.

In FIG. 1, the electronic control device 1 calculates a travel plan to a destination by using contents set by an autonomous drive setting unit 2, sensor values output from a plurality of sensors 3, information output from a communication device 4, host vehicle position information output from a vehicle position information acquisition unit 5, and map information stored in a map information storage unit 6.

Then, the electronic control device 1 outputs a control instruction value for achieving the calculated travel plan to a plurality of vehicle control devices 7. Each of the vehicle control devices 7 includes, for example, an engine, a transmission, a brake, a steering device, and an electronic control device for controlling the engine, transmission, brake, and the steering device.

The autonomous drive setting unit 2 is a device for an occupant of the vehicle to set a destination, a route, traveling speed, and the like during autonomous driving. The autonomous drive setting unit 2 includes an input device (not illustrated) for the occupant to perform setting. The input device includes, for example, a physical input device, such as a button or a touch panel, a gesture input device using a camera or infrared sensor, or a voice input device.

The autonomous drive setting unit 2 outputs the information input by the occupant to the electronic control device 1 via the input device.

Each of the sensor 3 is a sensor for acquiring external information or vehicle state information, and includes, for example, a camera, a radar, an ultrasonic sensor, an acceleration sensor, a yaw rate sensor, or a wheel speed sensor. The sensor 3 outputs, as the sensor value, the acquired information to the electronic control device 1.

The communication device 4 communicates with the outside of the vehicle, for example, another vehicle or an infrastructure system and outputs information from outside the vehicle to the electronic control device 1.

The vehicle position information acquisition unit 5 is a device for acquiring the position of a host vehicle by using a radio wave from a navigation satellite, such as a global positioning system (GPS). The vehicle position information acquisition unit 5 outputs acquired host vehicle position information to the electronic control device 1.

The vehicle position information acquisition unit 5 may acquire the host vehicle position information by using a positioning system other than the GPS.

The map information stored in the map information storage unit 6 is map data used for autonomous driving and includes, for example, a road width, the number of lanes, gradient, the curvature of a curve, the shape of an intersection, and speed limit information. In FIG. 1, the map information is stored outside the electronic control device 1 but may be stored inside the electronic control device 1.

The electronic control device 1 internally includes a reconfigurable circuit 10, a controller 20, and a memory 40. The reconfigurable circuit 10 is a circuit having an internal circuit, the configuration of which is changeable, and includes, for example, a filed programmable gate array (FPGA) or a complex programmable logic device (CPLD).

The reconfigurable circuit 10 internally includes a surrounding situation perception unit 11, a risk map generation unit 12, a travel plan evaluation unit 13, and a reconfiguration control unit 16.

On the basis of the sensor values output from the sensors 3 and the information output from the communication device 4, the surrounding situation perception unit 11 perceives situations around the host vehicle, for example, the contents of road signs, traffic signal situations, other vehicles around the host vehicle, and pedestrian situations.

Then, the surrounding situation perception unit 11 outputs peripheral perception information to the risk map generation unit 12.

The risk map generation unit 12 generates a risk map 41 used for travel plan evaluation by using the host vehicle position information output from the vehicle position information acquisition unit 5, the map information stored in the map information storage unit 6, and the peripheral perception information output from the surrounding situation perception unit 11. Details of the risk map 41 will be described later with reference to FIG. 3. The risk map generation unit 12 stores the generated risk map 41 in the memory 40.

Note that, in the first embodiment, the processing of the surrounding situation perception unit 11 and the risk map generation unit 12 is performed in the reconfigurable circuit 10, but the processing may be performed in the controller 20. Furthermore, the processing may be performed by another processing device inside the electronic control device 1 or a processing device outside the electronic control device 1.

The travel plan evaluation unit 13 includes a plurality of independent evaluation calculation units 141 to 14N. In the first embodiment, the number of the evaluation calculation units 141 to 14N is set to N.

In addition, each of the evaluation calculation units 141 to 14N includes a vehicle model (not illustrated) and a risk map holding area 15 therein. In the risk map holding area 15, the risk map 41 used for the travel plan evaluation is partially stored.

The evaluation calculation units 141 to 14N use the host vehicle position information output from the vehicle position information acquisition unit 5, the travel plan parameters 251 to 25N output from the controller 20, and the vehicle model in the evaluation calculation unit to calculate the traveling trajectory, traveling speed, and the like of the vehicle. Thereafter, the evaluation calculation units 141 to 14N evaluates the travel plan parameters 251 to 25N by using the calculated traveling trajectory and traveling speed of the vehicle, target point information 23 output from the controller 20, risk map information stored in the risk map holding areas, and outputs evaluation results 261 to 26N to the controller 20. Details of the contents of this evaluation will be described later.

In the first embodiment, each of the evaluation calculation units 141 to 14N includes the risk map holding area 15. However, the number of the risk map holding areas 15 for the evaluation calculation units does not necessarily correspond one-to-one with the number of the evaluation calculation units 141 to 14N, and a risk map holding area 15 may be shared between the plurality of evaluation calculation units 141 to 14N. However, a plurality of the risk map holding areas 15 are required.

The reconfiguration control unit 16 reconfigures the evaluation calculation units 141 to 14N. When a reconfiguration instruction 27 is output from the controller 20, the reconfiguration control unit 16 selects data matching reconfiguration circuit data information 29 from among circuit data 421 to 42X stored in the memory 40, and reads the data, as circuit data 43, from the memory 40. On the basis of the circuit configuration data 43, the reconfiguration control unit 16 reconfigures evaluation calculation units of the evaluation calculation units 141 to 14N corresponding to information 28 about calculation units to be reconfigured. After the reconfiguration is completed, the reconfiguration control unit 16 outputs a reconfiguration completion signal 30 to the controller 20.

The controller 20 internally includes a driving state control unit 21, a travel plan parameter generation/selection unit 24, and a parameter conversion unit 32.

The driving state control unit 21 determines a current driving state on the basis of autonomous driving setting information output from the autonomous drive setting unit 2, the host vehicle position information output from the vehicle position information acquisition unit 5, and the map information, and determines a target point in the travel plan.

Then, the determined driving state 22 (signal indicating the driving state) is output to the path parameter generation/selection unit 24, and a target point 23 determined is output to the travel plan evaluation unit 13.

The driving state 22 includes, for example, a straight traveling state, a right-hand curve state, a left-hand curve state, a right turning state, a left turning state, and a preceding vehicle following state. Furthermore, the first embodiment employs a method of calculating a travel plan for each of sections obtained by partitioning a route to a destination which is set by the autonomous drive setting unit 2 into several sections, and the above-described target point 23 represents a target coordinate position in each section.

Note that in the first embodiment, the processing of the driving state control unit 21 is performed by the controller 20, but this processing may be performed by the reconfigurable circuit 10. Furthermore, this processing may be performed by another processing device inside the electronic control device 1 or a processing device outside the electronic control device 1. Furthermore, it is also possible to arrange the driving state control unit 21 not inside the controller 20 but outside the controller 20.

The travel plan parameter generation/selection unit 24 generates the travel plan parameters 251 to 25N and outputs the travel plan parameters 251 to 25N to the evaluation calculation units 141 to 14N. The travel plan parameters 251 to 25N are information for calculating the traveling trajectory and traveling speed of the vehicle and include, for example, a steering angle and acceleration/deceleration of the host vehicle, and a coordinate position of the host vehicle at a certain time.

FIG. 2 is a table illustrating an example of steering angles and accelerations/decelerations of the host vehicle as the travel plan parameters. In an example illustrated in FIG. 2, the steering angle and acceleration/deceleration of the host vehicle are defined at every $\Delta t$ seconds up to $n\Delta t$ seconds. Furthermore, on the basis of calculation results 261 to 26N output from the evaluation calculation units 141 to 14N, the travel plan parameter generation/selection unit 24 selects a best travel plan parameter and outputs the selected travel plan parameter, as an optimal travel plan parameter 31, to the parameter conversion unit 32.

In order to reconfigure the evaluation calculation units 141 to 14N, the travel plan parameter generation/selection unit 24 also performs processing of outputting the reconfiguration instruction 27, the information 28 about calculation units to be reconfigured, and the reconfiguration circuit data information 29 to the reconfiguration control unit 16, in addition to the processing described above.

On the basis of the optimal travel plan parameter 31 output from the travel plan parameter generation/selection unit 24, the parameter conversion unit 32 calculates an instruction value for each vehicle control device 7 and outputs the calculated instruction value as the control instruction value to the vehicle control device 7.

The memory 40 internally includes the risk map 41 and the circuit data 421 to 42X. In the first embodiment, X pieces of circuit data 421 to 42X are stored in the memory 40, but this number of data is merely an example.

In the first embodiment, the risk map 41 and the circuit data 421 to 42X are stored in the same memory 40, but the risk map 41 and the circuit data 421 to 42X may be separately stored in a plurality of memories.

Figure 3:
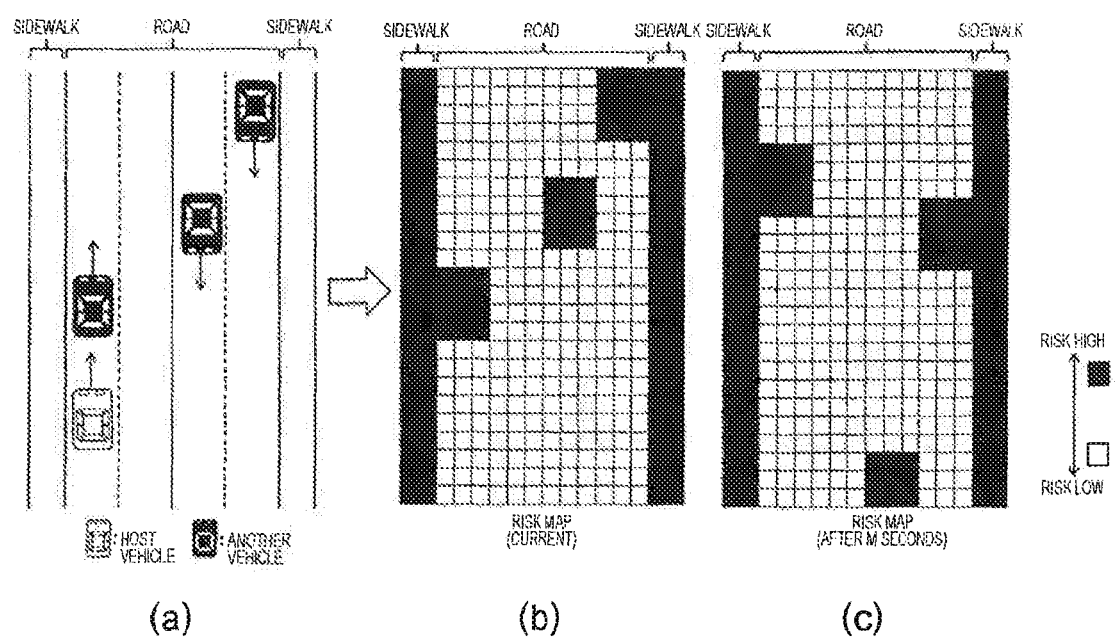
FIG. 3 is diagrams each illustrating an example of a risk map.

FIG. 3 is diagrams each illustrating an example of the risk map. In (a) on the left side of FIG. 3, a current situation around the host vehicle is illustrated, and one vehicle is in front of the host vehicle and two vehicles (other vehicles) (shown in dark) are in the opposite lanes. This state is represented in the risk map, as in the risk map (current) illustrated in (b) of FIG. 3. A portion including an obstacle such as a vehicle has a high risk (black) and a portion including a road with no obstacle has a low risk (white (squares)). Furthermore, a portion through which no vehicle is allowed to pass, such as a sidewalk, also has a high risk (black).

In addition to the current state, the risk map generation unit 12 also creates a future risk map by prediction. The future risk map is created to determine whether the host vehicle collides with an obstacle at a future host vehicle position in the travel plan evaluation. The risk map generation unit 12 predicts a future position of a peripheral object according to the moving speed of the object around the host vehicle and creates the future risk map on the basis of the future position. In an example of (c) of FIG. 3, a risk map after M seconds from the current time is illustrated, but the vehicle in front of the host vehicle and vehicles in the opposite lanes are predicted to move for M seconds, and the positions having the higher risk (black) are different from those in the current risk map.

The number of the risk maps is determined depending on a time interval and a maximum time in the travel plan parameter. As illustrated in FIG. 2, in a case where the travel plan parameters are defined at every $\Delta t$ seconds for $n\Delta t$ seconds, it is necessary as well to create the risk maps at every $\Delta t$ seconds for $n\Delta t$ seconds. Therefore, the number of the risk maps generated in this case is n.

<Travel Plan Evaluation Calculation>

An example of a travel plan evaluation calculation performed by the evaluation calculation units 141 to 14N will be described.

The evaluation calculation units 141 to 14N perform calculation of the evaluation results of the travel plan on the basis of the following Formula (1). A smaller calculation result of Formula (1) is determined to be a more suitable travel plan parameter. Therefore, in this example, the travel plan parameter generation/selection unit 24 selects a travel plan parameter having the smallest evaluation result as the optimal travel plan parameter 31.

$$\text{Evaluation result} = H1 + H2 + H3 \quad (1)$$

In Formula (1), H1 is a risk assessment value during traveling. H2 and H3 will be described later.

In this risk assessment, risks are calculated at time intervals ($\Delta t$ seconds in FIG. 2) according to the travel plan parameter, the risks in the respective time blocks are accumulated, and the assessment value is calculated. This risk assessment is performed by using the risk map information stored in the risk map holding area 15 in each of the evaluation calculation units 141 to 14N.

Figure 4:
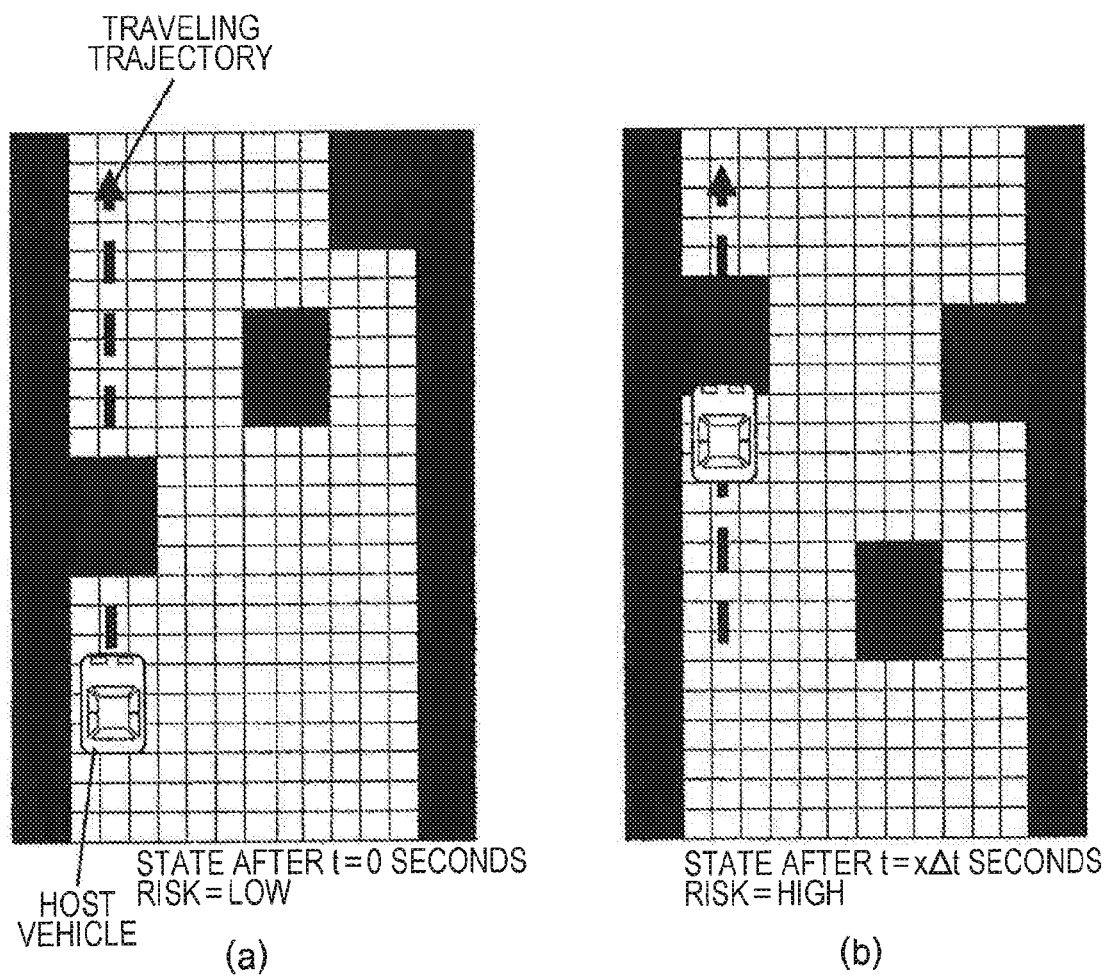
FIG. 4 is diagrams each illustrating an example of risk assessment calculated in travel plan evaluation.

FIG. 4 is diagrams each illustrating an example of risk assessment in travel plan evaluation calculation. Note that the situation around the vehicle in FIG. 4 is the same as that in FIG. 3. In (a) on the left side of FIG. 4, a diagram of a state after t=0 seconds is illustrated. In the state after t=0 seconds, all risk map information about the host vehicle position shows a state of low risk (white), and the risk at this time is small.

In (b) on the right side of FIG. 4, a diagram of a state after t=xΔt seconds is illustrated. The host vehicle and the other vehicles are traveling straight ahead in the movement directions thereof, and this map has a state different from the map after t=0 seconds. After t=xΔt seconds, the host vehicle is in contact with the vehicle traveling ahead, and the host vehicle position partially has a state of high risk (black). Therefore, the risk at this time is high.

In this way, when the travel plan parameter takes such a traveling trajectory that the host vehicle collides with the obstacle, H1 has a large value. Therefore, such a travel plan parameter is not selected as the optimal travel plan parameter 31.

In Formula (1), H2 is an assessment value of a travel time up to a point indicated by the target point information 23. The shorter the travel time, the smaller the value of H2.

In Formula (1), H3 is a value of ride comfort assessment during traveling. The ride comfort assessment is performed by using, for example, a longitudinal acceleration of the vehicle or a lateral acceleration of the vehicle in each time block during traveling. The better the ride comfort, the smaller the value of H3.

As described above, in the evaluation of the travel plan parameters, the risk H1, travel time H2, and ride comfort H3 during traveling are comprehensively evaluated. The travel plan parameters having results of no collision with the obstacle, a shorter travel time, and better ride comfort have a smaller value of the evaluation result.

<Reconfiguration of Travel Plan Evaluation Unit>

Figure 5:
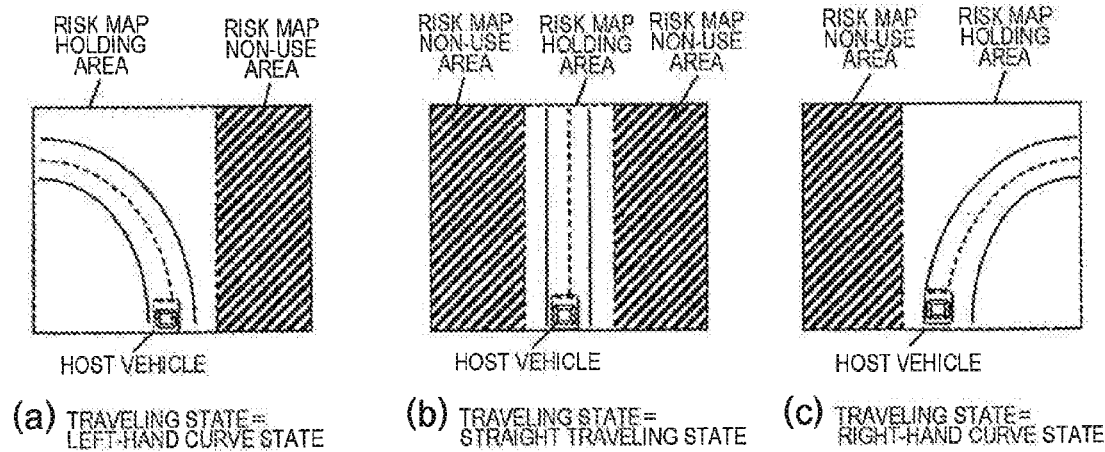
FIG. 5 is diagrams each illustrating an example of a size of a risk map holding area in a driving state.

Reconfiguration of the evaluation calculation units 141 to 14N makes a large change in the risk map holding areas 15. FIG. 5 is diagrams each illustrating an example of a size of the risk map holding area 15 in each driving state. In FIG. 5, (a) of FIG. 5 is a diagram illustrating the driving state 22 having the left-hand curve state.

In FIG. 5, (b) of FIG. 5 is a diagram in which the driving state 22 has the straight traveling state, and (c) of FIG. 5 is a diagram illustrating the driving state 22 having the right-hand curve state.

As illustrated in (a) of FIG. 5, when the driving state 22 is in the left-hand curve state, the host vehicle is considered not to have a trajectory along which the host vehicle makes a large rightward movement from a current position. That is, a risk map non-use area (shaded portion) of the risk map, positioned over the right side from the host vehicle, is not used. Therefore, a left side portion of the risk map excluding the risk map non-use area is enough for the size of the risk map holding area 15 in the left-hand curve state.

As illustrated in (b) of FIG. 5, when the driving state 22 is in the straight traveling state, the host vehicle is considered not to have a trajectory along which the host vehicle makes a large lateral movement (in a direction perpendicular to the movement direction). In other words, portions (portions of the risk map non-use areas) of the risk map, positioned over the right and left sides from the host vehicle is not used. Therefore, a center portion of the risk map excluding the risk map non-use areas is enough for the size of the risk map holding area 15 in the straight traveling state.

As illustrated in (c) of FIG. 5, when the driving state is in the right-hand curve state, the host vehicle is considered not to have a trajectory along which the host vehicle makes a large leftward movement from a current position. Therefore, as in the left-hand curve state and the straight traveling state, a right side portion of the risk map excluding the risk map non-use area is enough for the size of the risk map holding area 15.

Dynamic reconfiguration of the evaluation calculation units 141 to 14N depending on the driving state for optimization of the size of the risk map holding area 15 causes a reduction in circuit area of the evaluation calculation units 141 to 14N, compared with risk maps having the large risk map holding areas 15 corresponding to all driving states. Therefore, it is possible to increase the number of the evaluation calculation units 141 to 14N even in the same circuit area and a calculation capacity for the travel plan evaluation can be increased.

Figure 6:
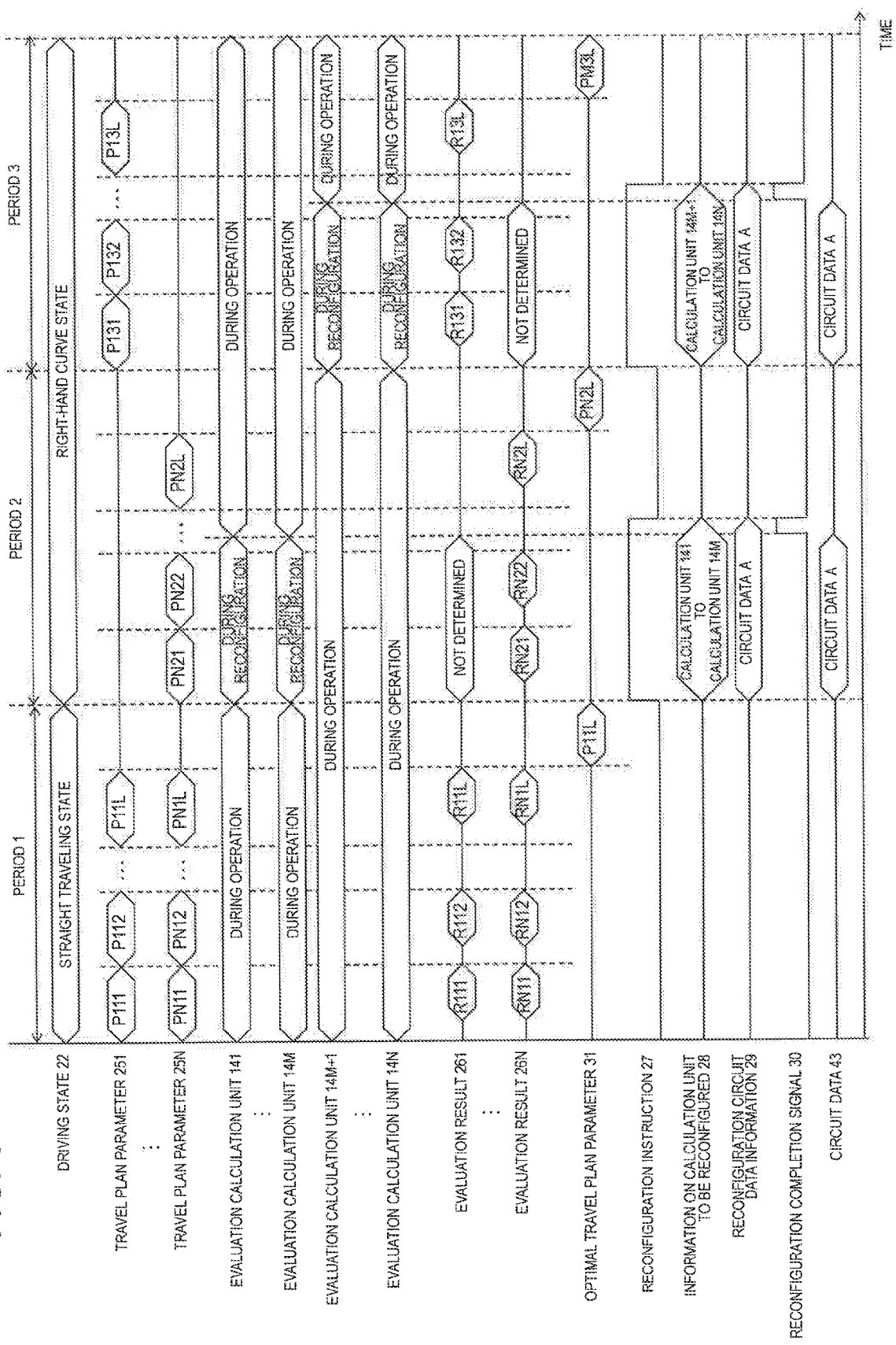
FIG. 6 is a diagram illustrating an exemplary timing chart during reconfiguration of evaluation calculation units according to the first embodiment.

FIG. 6 is a diagram illustrating an exemplary timing chart during reconfiguration of the evaluation calculation units according to the first embodiment.

In FIG. 6, period 1 is a period in which the evaluation calculation units 141 to 14N are not reconfigured but perform normal processing. In this period, the driving state 22 is in the straight traveling state, and the travel plan parameter generation/selection unit 24 firstly outputs P111 as the travel plan parameter 251 to the evaluation calculation unit 141.

In addition, the travel plan parameter generation/selection unit 24 outputs P211 to PN11 independently as the travel plan parameters 251 to 25N to the other evaluation calculation units 142 to 14N. The evaluation calculation units 141 to 14N evaluate the respective travel plan parameters and output corresponding evaluation results to the travel plan parameter generation/selection unit 24. For example, R111 of the evaluation result 261 represents a result of an evaluation of the travel plan parameter P111, and RN11 of the evaluation result 26N represents a result of an evaluation of the travel plan parameter PN11.

Thereafter, the travel plan parameter generation/selection unit 24 changes the values of the travel plan parameters 251 to 25N (P112 to PN12) and outputs the values to the evaluation calculation units 141 to 14N. The evaluation calculation units 141 to 14N evaluate the respective travel plan parameters 251 to 25N (P112 to PN12) and output the corresponding evaluation results 261 to 26N (R112 to RN12) to the travel plan parameter generation/selection unit 24.

After completion of the evaluation performed by a defined number of times (1 to L), the travel plan parameter generation/selection unit 24 uses the evaluation results 261 to 26N (R111 to R11L, . . . , RN11 to RN1L) obtained from the evaluation calculation units 141 to 14N, selecting the best travel plan parameter having the best evaluation result from among the travel plan parameters 251 to 25N (P111 to P11L, . . . , PN11 to PN1L) as the optimal travel plan parameter 31. In the example of FIG. 6, the travel plan parameter P11L is selected as the optimal travel plan parameter 31.

The next driving state is the right-hand curve state, and this right-hand curve state is divided into the first period 2 and the next period 3. Period 2 is set as a path update period.

In period 2, the driving state 22 is switched from the straight traveling state to the right-hand curved state. In response to this, the travel plan parameter generation/selection unit 24 reconfigures some of the evaluation calculation units 141 to 14N.

In the example of FIG. 6, M evaluation calculation units of the evaluation calculation units 141 to 14M are reconfigured during period 2. In order to perform the reconfiguration, the travel plan parameter generation/selection unit 24 activates the reconfiguration instruction 27 to transmit information on starting the reconfiguration to the reconfiguration control unit 16. In addition, the travel plan parameter generation/selection unit 24 sets numbers of evaluation calculation units to be reconfigured in the information 28 about calculation units to be reconfigured, and outputs the information 28 about calculation units to be reconfigured to the reconfiguration control unit 16. In this example, the values of the information 28 about calculation units to be reconfigured are the evaluation calculation units 141 to 14M.

To the evaluation calculation units 141 to 14M subjected to the reconfiguration, the travel plan parameter 251 to 25M are not output from the travel plan parameter generation/selection unit 24. To the evaluation calculation units 14M+1 to 14N, the travel plan parameters 25M+1 to 25N are output from the travel plan parameter generation/selection unit 24.

In addition, the travel plan parameter generation/selection unit 24 outputs, as the reconfiguration circuit data information 29, circuit data information for performing the reconfiguration to the reconfiguration control unit 16. In this example, in order to reconfigure the evaluation calculation units into a circuit configuration corresponding to the right-hand curve state, circuit data A selected from circuit data 1 to X is set to the circuit data reconfiguration circuit data information 29.

The reconfiguration control unit 16 receives the reconfiguration instruction 27, information 28 about calculation units to be reconfigured, and reconfiguration circuit data information 29 which are output from the travel plan parameter generation/selection unit 24, and reads the circuit data 43 corresponding to the reconfiguration circuit data information 29 from the memory 40. In this example, the circuit data 43 is the circuit data A. Then, the reconfiguration control unit 16 reconfigures the evaluation calculation units 141 to 14M corresponding to the information 28 about calculation units to be reconfigured.

During the reconfiguration, the evaluation calculation units 141 to 14M output indeterminate values. After the reconfiguration of the evaluation calculation units 141 to 14M is normally completed, the reconfiguration control unit 16 outputs the reconfiguration completion signal 30 to the travel plan parameter generation/selection unit 24.

The travel plan parameter generation/selection unit 24 receives the output of the reconfiguration completion signal 30 and deactivates the reconfiguration instruction 27. Thus, the reconfiguration processing in period 2 is completed.

During period 2, even while the evaluation calculation units 141 to 14M are being reconfigured, the other evaluation calculation units (the evaluation calculation units 14M+1 to 14N) evaluate the travel plan parameters as usual. The travel plan parameter generation/selection unit 24 selects the optimal travel plan parameter 31 on the basis of the evaluation results 26M+1 to 26N output from the evaluation calculation units 14M+1 to 14N. In the example of FIG. 6, the optimal travel plan parameter 31 in period 2 is PN2L.

In period 3, following period 2, the driving state 22 is in the right-hand curve state. At this time, the travel plan parameter generation/selection unit 24 reconfigures the evaluation calculation units 14M+1 to 14N which have not been reconfigured in period 2. In period 3, the travel plan parameters 25M+1 to 25N are not output from the travel plan parameter generation/selection unit 24 to the evaluation calculation units 14M+1 to 14N which are to be reconfigured.

The method for reconfiguration is performed as described in period 2, and the travel plan parameter generation/selection unit 24 activates the reconfiguration instruction 27 and sets the evaluation calculation units 14M+1 to 14N in the information 28 about calculation units to be reconfigured, and sets the circuit data A as the reconfiguration circuit data information 29.

The reconfiguration control unit 16 receives the reconfiguration instruction 27, information 28 about calculation units to be reconfigured, and reconfiguration circuit data information 29 which are output from the travel plan parameter generation/selection unit 24 and reads the circuit data A corresponding to the reconfiguration circuit data information 29 from the memory 40, that is, from the circuit data 43.

Then, the reconfiguration control unit 16 reconfigures the evaluation calculation units 14M+1 to 14N corresponding to the information 28 about calculation units to be reconfigured. During the reconfiguration, the evaluation calculation units 14M+1 to 14N output indeterminate values. After the reconfiguration is normally completed, the reconfiguration control unit 16 outputs the reconfiguration completion signal 30 to the travel plan parameter generation/selection unit 24.

The travel plan parameter generation/selection unit 24 receives the output of the reconfiguration completion signal 30 and deactivates the reconfiguration instruction 27. Thus, the reconfiguration processing in period 3 is completed.

During period 3, even while the evaluation calculation units 14M+1 to 14N are being reconfigured, the other evaluation calculation units (the evaluation calculation units 141 to 14M) evaluate the travel plan parameters as usual. The travel plan parameter generation/selection unit 24 selects the optimal travel plan parameter 31 on the basis of the evaluation results 261 to 26M output from the evaluation calculation units 141 to 14M. In the example of FIG. 6, the optimal travel plan parameter 31 in period 3 is PM3L.

Note that in the example of FIG. 6, the evaluation calculation units 141 to 14N are divided into two blocks for reconfiguration, but may be further divided to perform reconfiguration a larger number of times.

Furthermore, in the example of FIG. 6, during period 2 and period 3, the travel plan parameter generation/selection unit 24 does not output the travel plan parameters to the evaluation calculation units for which the reconfiguration has been completed during a corresponding period, but after completion of the configuration, the evaluation calculation units can operate normally, and, immediately after the completion of the reconfiguration, the travel plan parameters 251 to 25M or 25M+1 to 25N may be input to the reconfigured evaluation calculation units 141 to 14M or 14M+1 to 14N to start the evaluation operation of the travel plan parameters.

That is, the travel plan parameter generation/selection unit 24 may be configured to determine the evaluation calculation units 141 to 14M or 14M+1 to 14N for which the reconfiguration has been finished, and output the evaluation results almost simultaneously with completion of the reconfiguration. The travel plan parameter generation/selection unit 24 may also be configured to output the travel plan parameters to the evaluation calculation units from which the evaluation results are output.

With this configuration, it is possible to increase the number of evaluation calculation units operating simultaneously in a control cycle to increase the number of parameters to be evaluated. Thus, the operation of the vehicle can be controlled more optimally.

As described above, according to the first embodiment, when the driving state 22 changes, the travel plan parameter generation/selection unit 24 divides the evaluation calculation units 141 to 14N into a plurality of blocks for reconfiguration via the reconfiguration control unit 16.

Dividing the reconfiguration of the evaluation calculation units 141 to 14N a plurality of times enables continuation of evaluation of the travel plan in the rest of the evaluation calculation units, even while some of the evaluation calculation units 141 to 14N are being reconfigured.

Therefore, according to the first embodiment, it becomes unnecessary to perform alternative processing, such as outputting the travel plan having been evaluated last time. Thus, an electronic control device can be achieved which is configured so that even though the situation around the host vehicle is changed during the reconfiguration of some of the evaluation calculation units 141 to 14N, the travel plan can be changed promptly according to the situation, and even during the dynamic reconfiguration of the calculation circuit configuration, an optimal travel plan can be calculated.

Second Embodiment

Next, a second embodiment according to the present invention will be described. The second embodiment is a modification of the first embodiment.

Figure 7:
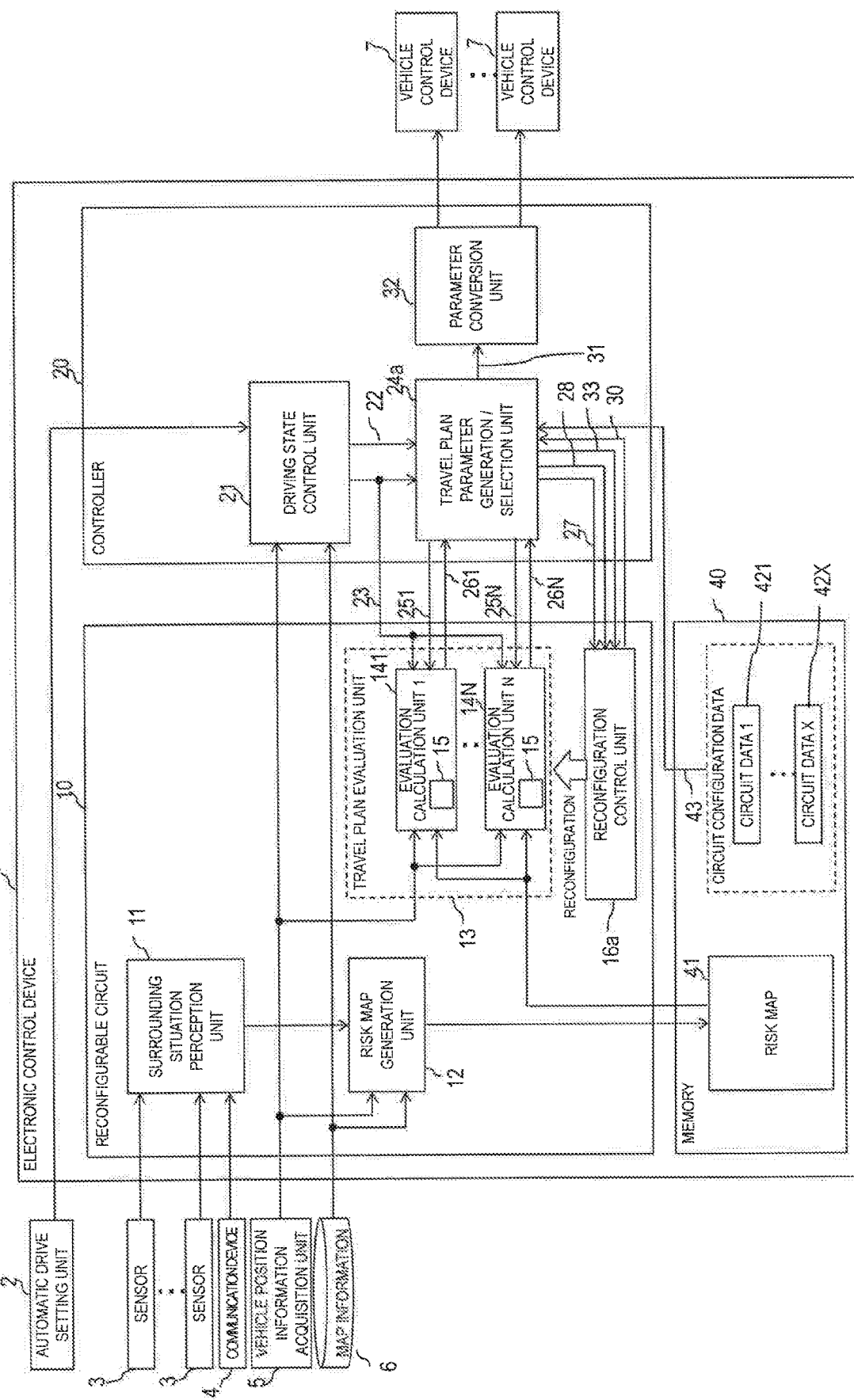
FIG. 7 is a diagram illustrating a configuration example of an electronic control device and peripheral circuits according to a second embodiment.

FIG. 7 is a diagram illustrating a configuration example of an electronic control device and peripheral circuits according to a second embodiment. Note that the same reference numerals are given to the same elements as those in the first embodiment, and the description of the same elements will be omitted.

In FIG. 7, when reconfiguring the evaluation calculation units 141 to 14N, a travel plan parameter generation/selection unit 24a reads, as the circuit data 43, any of the circuit data 421 to 42X, from the memory 40 and stores the circuit data 43 in the travel plan parameter generation/selection unit 24a.

Then, the travel plan parameter generation/selection unit 24a outputs, as reconfiguration circuit data 33, the circuit data 43 held therein to a reconfiguration control unit 16a, instead of the reconfiguration circuit data information 29 illustrated in FIG. 1.

When the reconfiguration instruction 27 is output from the travel plan parameter generation/selection unit 24, the reconfiguration control unit 16a illustrated in FIG. 7 reconfigures the evaluation calculation units set in the information 28 about calculation units to be reconfigured, on the basis of the reconfiguration circuit data 33 output from the travel plan parameter generation/selection unit 24a.

Figure 8:
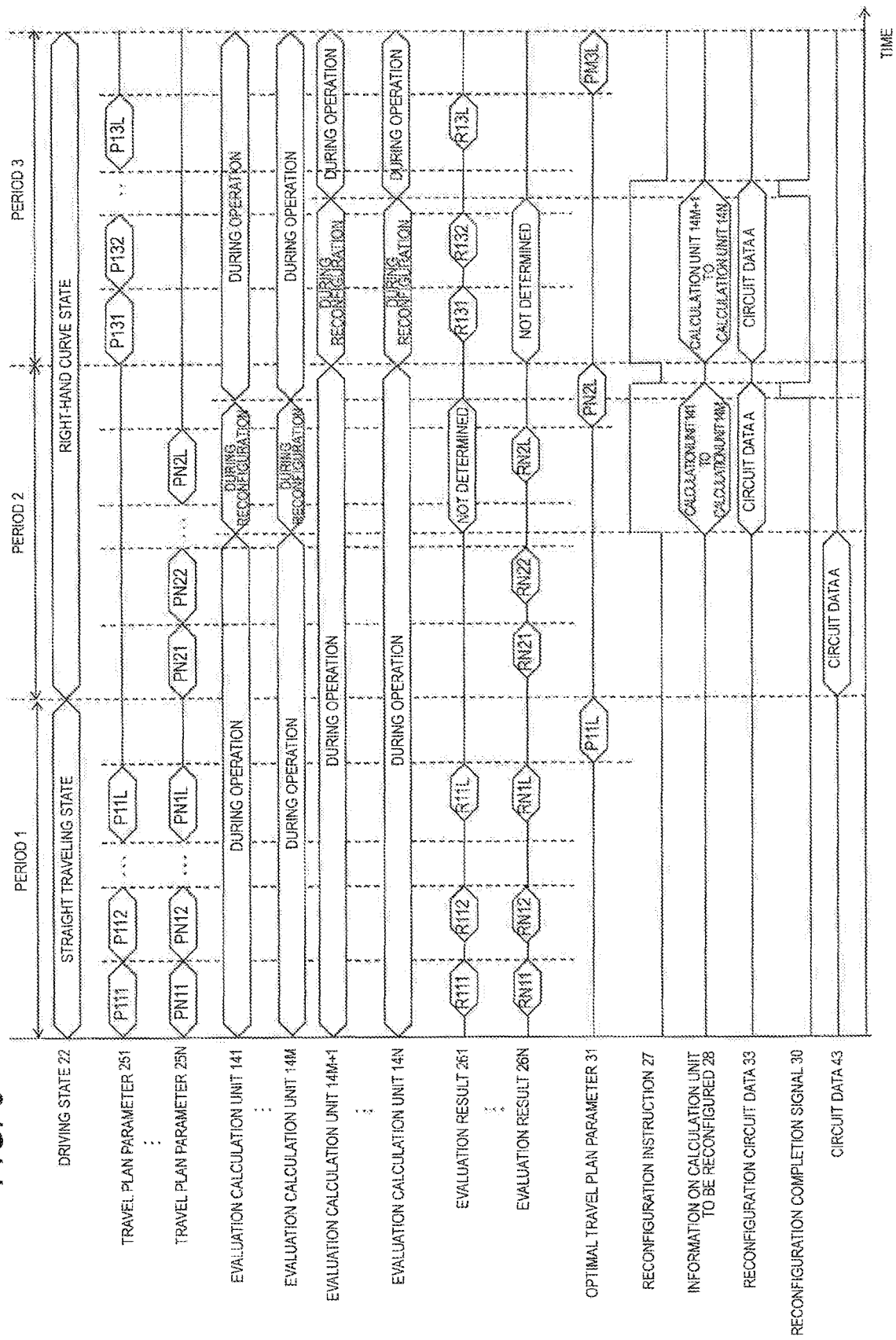
FIG. 8 is a diagram illustrating an exemplary timing chart during reconfiguration of evaluation calculation units according to the second embodiment.

FIG. 8 is a diagram illustrating an exemplary timing chart during reconfiguration of the evaluation calculation units according to the second embodiment.

In FIG. 8, in order to reconfigure the evaluation calculation units 141 to 14M, the travel plan parameter generation/selection unit 24a firstly reads, from the memory 40, the circuit data 43 for reconfiguration of the evaluation calculation units 141 to 14M, in period 2. In this example, the content of the circuit data 43 is circuit data A.

After reading the circuit data 43 is completed, the travel plan parameter generation/selection unit 24a internally holds the circuit data 43. Then, the travel plan parameter generation/selection unit 24a activates the reconfiguration instruction 27 to output the information 28 about calculation units to be reconfigured and the reconfiguration circuit data 33 to the reconfiguration control unit 16a. Here, the content of the reconfiguration circuit data 33 is the circuit data A having been read from the memory 40 as described above.

When the reconfiguration of the evaluation calculation units 141-14M set in the information 28 about calculation units to be reconfigured is completed, the reconfiguration control unit 16a activates the reconfiguration completion signal 30. After confirming the activation of the reconfiguration completion signal 30, the travel plan parameter generation/selection unit 24a deactivates the reconfiguration instruction 27. Thus, the reconfiguration processing for the evaluation calculation units 141 to 14M is completed.

In period 3, for reconfiguration of the evaluation calculation units 14M+1 to 14N, the travel plan parameter generation/selection unit 24a activates the reconfiguration instruction 27 and outputs the information 28 about calculation units to be reconfigured and the reconfiguration circuit data 33 to the reconfiguration control unit 16a.

Here, the content of the reconfiguration circuit data 33 is the circuit data A as in period 2. Note that since the circuit data A is held in the travel plan parameter generation/selection unit 24a in period 2, processing for reading the circuit data A from the memory 40 does not occur in period 3.

After that, the reconfiguration control unit 16a reconfigures the evaluation calculation units 14M+1 to 14N and activates the reconfiguration completion signal 30 after completion of the reconfiguration. After confirming the activation of the reconfiguration completion signal 30, the travel plan parameter generation/selection unit 24a deactivates the reconfiguration instruction 27. Thus, the reconfiguration processing for the evaluation calculation units 14M+1 to 14N is completed.

As described above, in the second embodiment, the circuit data 43 read from the memory 40 is held in the travel plan parameter generation/selection unit 24a, and the circuit data is transmitted from the travel plan parameter generation/selection unit 24a to the reconfiguration control unit 16a.

Accordingly, since the number of accesses to the memory 40 is reduced as compared with the first embodiment, it is possible to perform another memory access, for example, update processing for the risk map 41, earlier.

Therefore, as in the first embodiment, it is possible to achieve an electronic control device capable of calculating an optimal travel plan even during dynamic reconfiguration of a calculation circuit configuration.

In the second embodiment as well, as in the first embodiment, the evaluation calculation units 141 to 14M or 14M+1 to 14N for which the reconfiguration has been performed may be configured to output evaluation results almost simultaneously with completion of the reconfiguration so that the travel plan parameter generation/selection unit 24a outputs the travel plan parameter to the evaluation calculation units from which the results are output.

Note that the present invention is not limited to the above embodiments, and the present invention includes various modifications. For example, the above embodiments are described in detail for ease of understand the present invention, and therefore, the present invention is not necessarily limited to a device including all configurations described above.

Furthermore, part of a configuration of an embodiment may be replaced with a configuration of another embodiment, and further a configuration of an embodiment may be applied to a configuration of another embodiment. Still furthermore, for part of the configurations of the respective embodiments, additions, eliminations, or substitutions of another configuration may be made. Still furthermore, the configurations, functions, processing units, processing means, of the like described above may be partially or wholly achieved by hardware, such as a designed integrated circuit.

In addition, each of the above-described configurations, functions, or the like may be achieved by software through interpreting and executing a program for achieving each function by a processor. Information such as programs, tables, files which achieve functions can be stored in a recording device, such as memory, hard disk, or solid state drive (SSD) or a recording medium, such as IC card, SD card, or DVD.

The examples described above are examples in which the present invention is applied to vehicle control but are also applicable to any other than vehicle control (e.g., ship, robot, etc.).

In addition, in the above examples, the number of the evaluation calculation units 141 to 14M to be reconfigured first can be appropriately set depending on an application target. Furthermore, the number of the evaluation calculation units 141 to 14M to be reconfigured first can be changed according to the type of control operation.

In the above examples, traveling of the vehicle, which is switched from traveling on the straight road to traveling on the road curving to the right, has been described. However, the present invention is also applicable to a change in traveling, that is, from traveling on a local road to traveling on a highway, from traveling on a highway to traveling on a local road, from stopping to traveling, from traveling to stopping, or the like.

REFERENCE SIGNS LIST 1 electronic control device
2 autonomous drive setting unit
3 sensor
4 communication device
5 vehicle position information acquisition unit
6 map information storage unit
7 vehicle control device
10 reconfigurable circuit
13 travel plan evaluation unit
15 risk map holding area
16, 16a reconfiguration control unit
20 controller
21 driving state control unit
22 driving state
24, 24a travel plan parameter generation/selection unit
251 to 25N travel plan parameter
261 to 26N evaluation result
33 reconfiguration circuit data
40 memory
41 risk map
43 circuit data
141 to 14N evaluation calculation unit

The invention claimed is:
1. An electronic control device comprising:
a controller which outputs one of a plurality of travel plan parameters and a reconfiguration instruction;
a memory which stores data; and
a reconfigurable circuit which includes a plurality of evaluation calculation units for performing travel evaluation calculation by using the plurality of travel plan parameters,
wherein, when the reconfiguration instruction is output from the controller, the reconfigurable circuit
divides the plurality of evaluation calculation units into a plurality of blocks, for divisional performance of reconfiguration processing by a number of divisions,
starts the reconfiguration processing of a portion of the plurality of blocks, during the reconfiguration processing a remainder of the plurality of blocks, that are not undergoing the reconfiguration processing, evaluate the plurality of travel plan parameters, and
upon completion of the reconfiguration processing, receives a signal from the controller to deactivate the reconfiguration instruction and send to the controller the one of the plurality of travel plan parameters based on the evaluation; and
wherein the electronic control device is a vehicle control device used to autonomously drive a vehicle.

2. The electronic control device according to claim 1, wherein
the reconfigurable circuit supplies identical circuit data to the plurality of evaluation calculation units.

3. The electronic control device according to claim 2, wherein
the memory stores the circuit data and the reconfigurable circuit supplies circuit data read from the memory to the plurality of evaluation calculation units.

4. The electronic control device according to claim 2, wherein
the circuit data is transmitted from the controller to the reconfigurable circuit.

5. The electronic control device according to claim 1, wherein
the plurality of evaluation calculation units are divided into evaluation calculation units performing reconfiguration within a same period and evaluation calculation units performing reconfiguration within another period, and the controller outputs one of the plurality of travel plan parameters only to the evaluation calculation units that does not perform reconfiguration.

6. The electronic control device according to claim 1, further comprising
a driving state control unit which determines a driving state,
wherein the controller outputs the reconfiguration instruction on the basis of a driving state determined by the driving state control unit.

7. The electronic control device according to claim 6, wherein
the number of divisions is two.

8. The electronic control device according to claim 5, wherein
the controller determines evaluation calculation units for which reconfiguration has completed within the same period or within the other period to output one of the plurality of travel plan parameters to the evaluation calculation units for which reconfiguration has completed.

9. The electronic control device according to claim 6, wherein
the driving state control unit is disposed inside the controller.

* * * * *